April 29, 1969  R. J. STURM, JR  3,441,842
LINE FAULT DETECTION METHOD AND APPARATUS UTILIZING A TEST
SIGNAL HAVING A NONSINUSOIDAL WAVEFORM PREFERABLY
WITH AT LEAST ONE PIP PER CYCLE Filed Oct. 8, 1963

INVENTOR.
Rudolph J. Sturm, Jr.
BY
ATTORNEYS

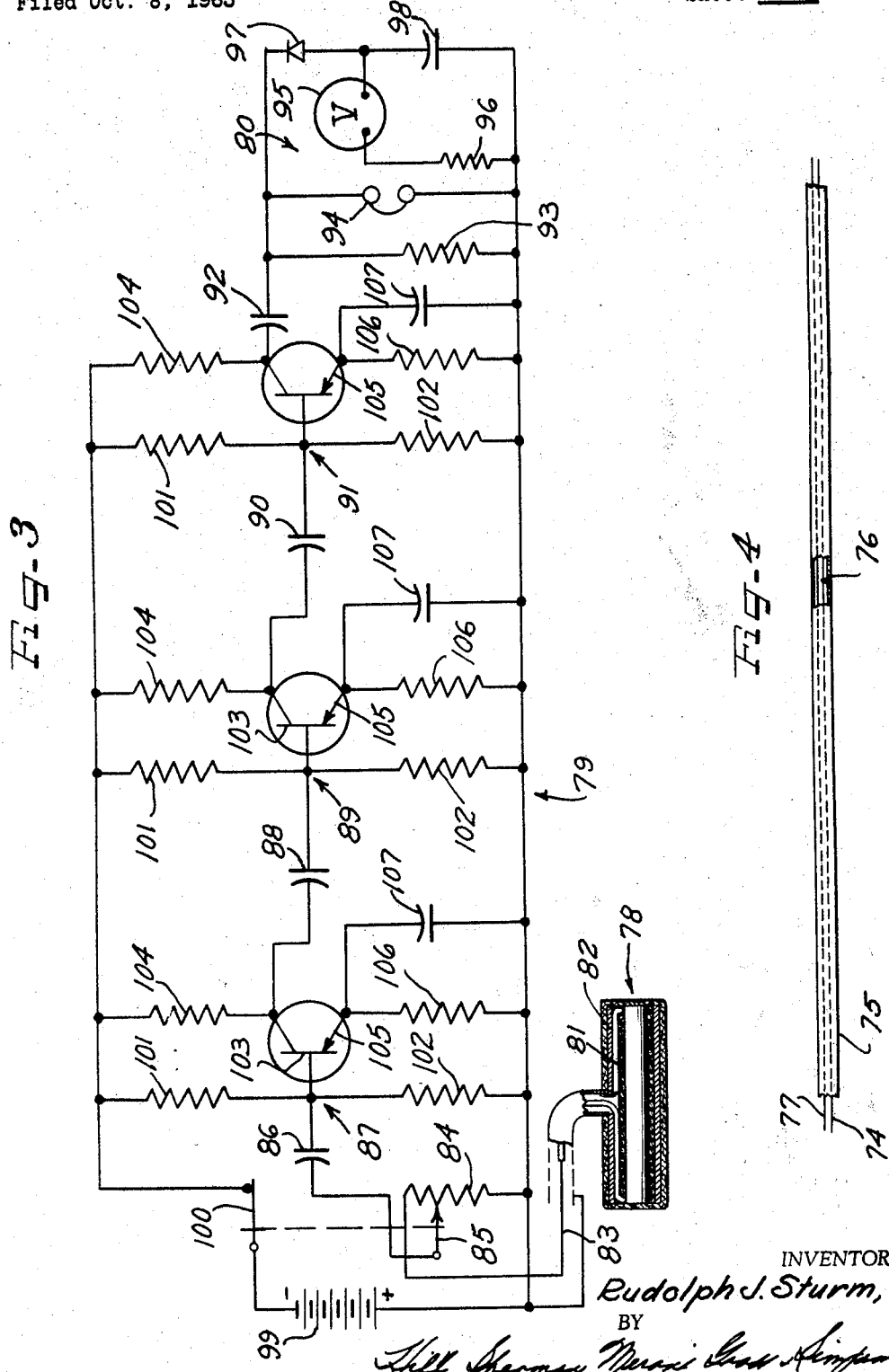

United States Patent Office 3,441,842
Patented Apr. 29, 1969

3,441,842
LINE FAULT DETECTION METHOD AND APPARATUS UTILIZING A TEST SIGNAL HAVING A NONSINUSOIDAL WAVEFORM PREFERABLY WITH AT LEAST ONE PIP PER CYCLE
Rudolph J. Sturm, Jr., 1255 N. St. Albans, St. Paul, Minn. 95117
Filed Oct. 8, 1963, Ser. No. 314,727
Int. Cl. G01r 31/10
U.S. Cl. 324—52                                     9 Claims

ABSTRACT OF THE DISCLOSURE

A line fault detection method and apparatus having a manually portable transistorized multivibrator for producing a distinctive signal having a pip, and a hand-size amplified inductive pickup responsive to the magnetic field produced by the unabalance of currents of the distinctive signal.

---

Figure 1:
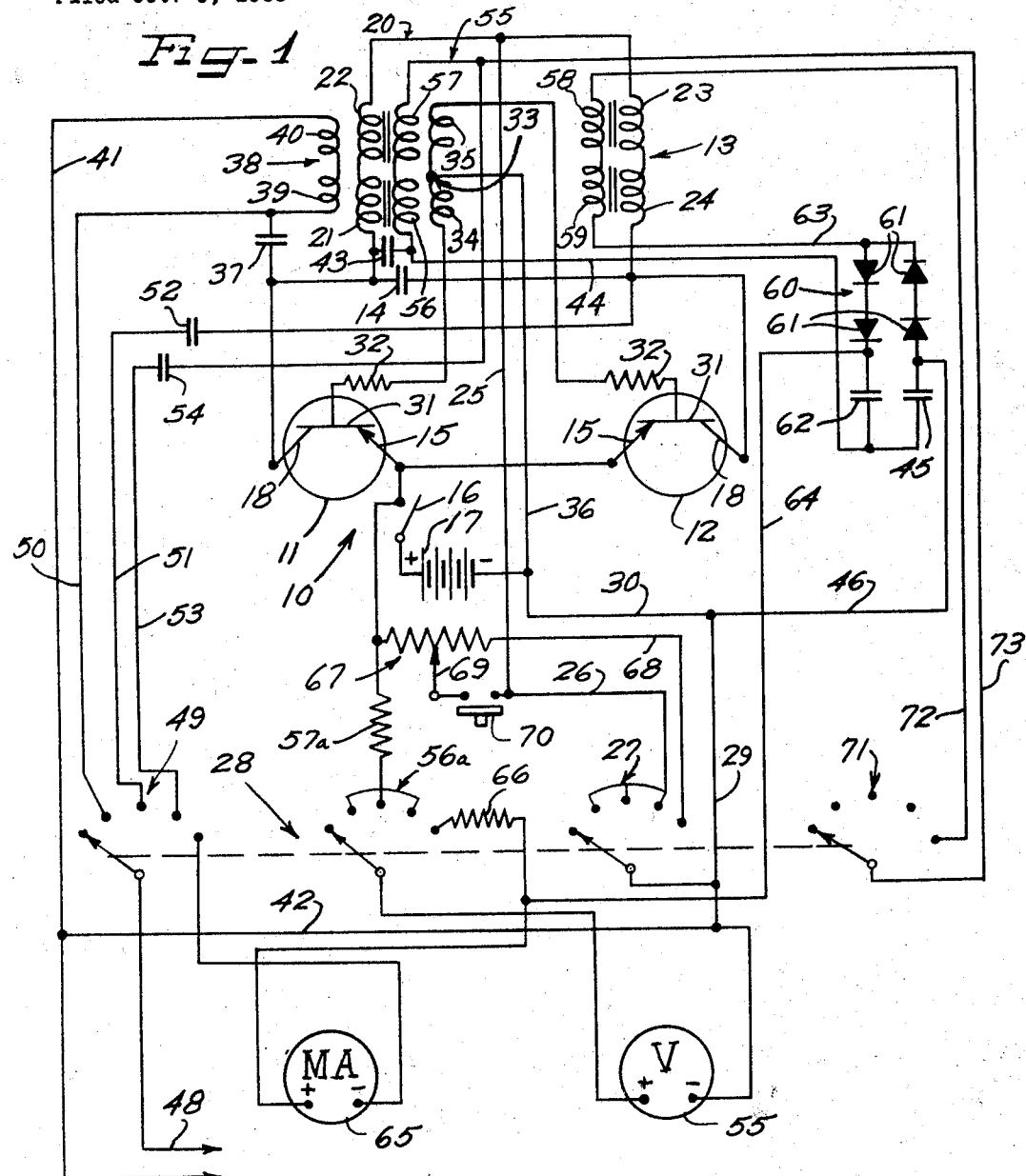

This invention relates to a method and means for detecting the location of a short in a shorted circuit.

Various kinds of test equipment have been provided by which the location of a short in a shorted circuit, or by which the location of a circuit may be detected. When the circuit under test is located physically adjacent to many other circuits which may then be energized, or when the circuit under test is located on a structure embodying a considerable amount of steel, or when both such conditions are present as in a diesel-electric locomotive, the problems involved in finding such circuit or short are greatly multiplied One such type of test equipment which has been used to locate shorts or unwanted grounds in railroad locomotives has a cost near $5,000.00, is mounted on a cart that needs the power of one man to push it across tracks to the locomotive to be tested, and contains a transformer which must be connected to a commercial source of alternating current. Such known equipment is of relatively low sensitivity, draws about one kilowatt of power, and may deliver a current at a voltage up to 2000 volts. The high voltage leads are connected to the faulty electric circuit, while another portion of the equipment is carried about by means of a shoulder strap to enable a rather heavy sensing coil to follow the circuity to the fault. I am aware of two fatal accidents that have occurred as a direct result of use of this type of equipment.

The present invention contemplates the utilization of a small, portable, self-powered, lightweight source of current which can be housed in a cabinet the size of which is about a 5-inch cube and which weighs less than five pounds. This current source is safe to both the user and to the equipment being tested since the power it delivers is usually less than one watt. The method and means by which current is applied to the circuit being tested is unique in that it comprises a composite electric current which preferably is rich in harmonics. The present invention further contemplates the utilization of a high sensitivity pickup and amplifier for detecting resulting magnetic fields, such portion of the device weighing less than eight ounces, being self-powered, and being about the same size as a pocket transistor radio.

Accordingly, it is an object of the present invention to provide a novel method and means for detecting the location of shorts, grounds, or circuits.

A further object of the present invention is to provide a novel method and means for detecting the location of a short in a shorted parallel transmission line.

A still further object of the present invention is to provide a method and means by which the location at which a conductor enclosed within a steel conduit and shorted to such conduit is identified.

Another object of the present invention is to provide a novel method and means for detecting the location of a short between a pair of physically parallel conductors in a shorted circuit.

Yet another object of the present invention is to employ a harmonically rich signal source to produce magnetic fields in one conductor which are not entirely cancelled by the adjacent field of another parallel conductor of the transmission line.

A still further object of the present invention is to provide an AC-pulse generator.

Yet another object of the present invention is to provide a combined AC-pulse generator and high voltage direct current source.

Another object of the present invention is to provide testing means of the type described which can be employed while adjacent circuity is left energized.

Another object of the present invention is to provide a ground and circuit detector which is portable, small, self-powered, lightweight, low-powered, highly sensitive, and safe to both the user and to the equipment being tested.

A still further object of the present invention is to provide test equipment of the type described which is so sensitive that it may be employed even though there is a steel plate disposed between the test equipment and the shorted circuit.

Another object of the present invention is to provide test equipment of the type described for testing circuits of low resistance, and for testing circuits which have an unwanted resistance to ground of up to approximately 75,000 ohms.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

Figure 2:
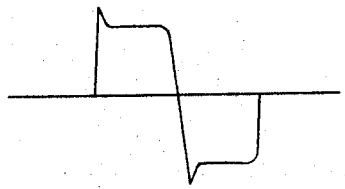

On the drawings:
FIGURE 1 is a schematic diagram of the generator portion of a circuit testing device provided in accordance with the principles of the present invention;
FIGURE 2 is an oscillogram of a signal provided by the circuit of FIGURE 1;
FIGURE 3 is a circuit diagram of a signal responsive portion of the same testing device; and
FIGURE 4 is a representation of a transmission line having a shorted conductor therein.

As shown on the drawings:
The principles of the present invention are particularly useful when embodied in a testing device such as shown in FIGURES 1 and 3, the portion shown in FIGURE 1 comprising a signal source, and the portion shown in FIGURE 3 comprising signal responsive indicating means.

Referring to FIGURE 1, there is shown a circuit diagram of a signal generator which is constructed to provide alternating current pulses or signals, and preferably also to supply high voltage direct current. For the purpose of this invention, it is essential that the alternating current signal be other than sinusoidal, and to this end, a structure is provided by which there is produced a substantially square wave having a spike at the leading edge of each pulse. The circuit in FIGURE 1 shows a representative structure by which such a signal may be provided Accordingly, there is provided a multivibrator 10 which includes a direct current powered pair of transistors 11, 12, a transformer 13, and a capacitor 14.

Each of the transistors 11 and 12 has an emitter 15 connected through an on-off switch 16 to the positive terminal of a battery 17. Each of the transistors 11 and 12 has a collector 18, such collectors 18 being connected together by a primary winding 20 of the transformer 13. The primary winding 20 includes a number of coils 21–24 connected in series. The collectors are also respectively connected to opposite sides of the capacitor 14.

The primary winding 20 is center-tapped, and is connected by leads 25 and 26, through a section 27 of a selector switch generally indicated at 28, and through leads 29 and 30 to the negative terminal of the battery 17.

The transistors 11 and 12 each have a base 31 respectively connected to one of a pair of resistors 32, 32, which are connected respectively to opposite ends of a center-tapped regenerative or tickler windnig 33. The winding 33 sreves as a control winding for regulating the bias potential present on each of the bases 31, and comprises a pair of coils 34, 35. The center-tap of the wniding 33 is connected by a lead 36 to a point of reference, here indicated as being the negative terminal of the battery 17.

When the switch 16 is first moved to a closed position, neither of the bases 31 is biased to block current flow therethrough. Thus, current tends to flow from the positive terminal of the battery 17 through the switch 16, thorugh each of the emitters 15, and through each of the collectors 18, the current flowing through the transistor 11 tending to flow through the coals 21 and 22 of the primary winding 20 to ground or negative battery terminal in one direction, while the current flowing through the transistor 12 tending to flow through the coils 23 and 24 of the same winding to ground or negative battery terminal in the opposite direction. This tendency creates a state of stability which is undesirable. To upset or unbalance such state of stability, there is provided a low impedance capacitive connection from one end of the primary winding 20 to the center-tap thereof, which is at the potential of the negative terminal of the battery 17. To this end, a capacitor 37 is provided which has one side thereof connected to the line which connects the coil 21 to the collector 18, and the other side of the capacitor 37 is connected through a secondary winding 38, consisting of a pair of coils 39 and 40, and thence through a pair of lines 41 and 42 to the line 29, and hence through the line 30 to the negative terminal of the battery 17.

With such structure present, current flowing from the transistor 11 will initially charge the capacitor 37, thereby delaying a flow of current from the transistor 11 to the coil 21. This delay enables current flowing from the other transistor 12 to the coil 24 to initially flow through hte coils 23 and 24, and thereby induce a signal in the coils 34 and 35. The induced potential in the coil 35 biases the base 31 of the transistor 12 to cutoff, while the potential in the coil 34 appearing on the base 31 of the transistor 11 renders it conductive. Since the induced signal was induced by current flowing through the transistor 12 through the coils 23 and 24, the field collapses, and current from the transistor 11 flows through the coils 21 and 22 to induce an opposite signal in the coils 34 and 35 of the tickler winding 33.

The multivibrator 10 thus has one astable or quasi-stable state wherein the transistor 12 is conductive and the transistor 11 is blocking, and a second astable or quasi-stable state wherein the transistor 11 in conducting and the transistor 12 is blocking. The primary winding 20 together with the capacitor 14 comprise a circuit which, because of the coaction of the tickler winding 33, switches back and forth between these two astable states.

The other or third state of stability initially described is thus intermediate the astable states and is eliminated or upset by the low impedance capacitative connection including the capacitor 37 through the secondary 28.

In this embodiment, there is a further low impedance capacitative connection which serves a similar function. To this end, a capacitor 43 has one side which is connected to the same line as the capacitor 37, namely between the collector 18 of the transistor 11 and the coil 21. The capacitor 43 is connected at its other side through a line 44 and through a further capacitor 45 and a line 46 to the line 30 and hence to the negative terminals of the battery 17. Thus, a further current delaying path is provided to upset the state of stability which otherwise would be present at the starting of the multivibrator 10.

The wave form of the signal induced at various points in the output transformer 13 is substantially that shown in FIGURE 2, it being understood that the voltages at such various points would differ, and the height of the spike being determined by the size of the capacitor 14.

A power outlet terminal is provided which includes a conductor 47 connected through the lines 42, 29, and 30 to the negative terminal of the battery 17, and a conductor 48 which is connected to the movable element of a further section 49 of the selector switch 28. The illustrated position of the selector switch 28 represents an off position thereof. The second terminal thereof is connected by a line 50 to the secondary winding 38 which is a high current, low voltage winding, a typical potential being .2 volt. The next terminal to which the the selector switch 28 may be position is connected through a line 51 and a coupling capacitor 52 to the high voltage side of the coils 23, 24 of the primary winding 13. A typical voltage available at this tap is 45 volts. The fourth tap of the selector switch portion 49 is connected by a line 53 and a coupling capacitor 54 to the center-tap of a secondary winding 55, composed of four coils 56–59. At this point, a potential of 120 volts is typically available.

In use, the power outlet terminals 47, 48 are connected to the shorted circuit to be tested, which may have a very low impedance, or which may have a relatively high impedance, such as 75,000 ohms. The selector switch 28 is then positioned to approximately match the impedance of the signal source with the line to be tested as described later herein. An indication of strength of the battery 17 is provided by a voltmeter 55, the positive terminal of which is connected through a section 56a of the selector switch 28 and through a multiplier or range resistor 57a and the switch 16 to the positive terminal of the battery 17. The negative terminal of the voltmeter 55 is connected through the lines 29 and 30 to the negative terminal of the battery 17.

The output transformer 13 has laminations in the form of a hollow square. The coils 39, 21, 56, 34, 59, and 24 are disposed or wrapped around one leg of such square, while the coils 40, 22, 57, 35, 58, and 23 are wound about the opposite leg thereof. Each of the primary coils 21–24 comprises 25 turns of two No. 29 wires wound and connected in parallel. Each of the secondary winding coils 56–59 comprises 900 turns of No. 40 wire. Each of the coils 39, 40 of the secondary winding 38 comprises three turns of No. 20 wire. The tickler winding 33 comprises one center-tapped coil having 60 turns of No. 29 wire.

In addition to providing the non-sinusoidal periodic signal or pulse such as indicated in FIGURE 2, the generator may be utilized to provide a source of high voltage direct current for conducting leakage tests. To this end, there is provided rectifier means indicated at 60, comprising a fullwave rectifier including four rectifiers 61, the capacitor 45, and a further capacitor 62. One side of each of the capacitors 45 and 62 is connected by the line 44 to one side of the secondary winding 55, and the other side of secondary winding 55 is connected by a line 63 to the opposite point in the bridge. The line 46, having a negative polarity from the battery 17, is connected between the capacitor 45 and the adjacent rectifier, while a line 64 is connected between the capacitor 62 and its adjacent rectifier 61. The line 64 passes in series through a milliammeter 65 and thence to a fifth tap on the selector switch section 49 for connection to the power outlet terminal 48. Placing the selector switch 28 in this position thus disconnects the transformer winding from the power outlet terminal and connects the rectifier means 60 thereto. Such positioning also disconnects the positive terminal of the voltmeter 55 from the range resistor 57a and connects it to a range resistor 66 of somewhat higher value which is connected to the line 64.

When the generator is used a source of pulses, the center-tap of the primary winding 55 is connected through the second, third, and fourth taps of the selector switch section 27, and thence through the lines 29 and 30 to the negative terminal of the battery 17. When the generator is used as a source of high voltage direct current, with the selector switch in the fifth position, the foregoing connection for the center-tap is interrupted, and in place of the direct connection thus afforded between the battery 17 and the multivibrator 10, there is inserted in such center-tap line 25 an adjustable voltage divider 67 in the nature of a potentiometer. One side of the potentiometer 67 is connected through the switch 16 to the positive terminal of the battery 17, and the other side of the potentiometer 67 is connected through a line 68, through the selector switch section 27 and the lines 29 and 30 to the negative terminal of the battery 17. Thus, the entire battery voltage appears across the potentiometer winding. The potentiometer includes a slider 69 connected through a momentary switch or push button 70 to the line 25. With the selector switch in the fifth position, and with the switch 16 closed, the multivibrator circuit is incomplete until the button 70 is depressed. Upon depressing such button, and depending upon the position of the slider 69, a variable or adjustable potential is applied to the multivibrator, by raising the potential of the center-tap of the primary winding with respect to the negative terminal of the battery 17.

In AC-operation of the device, the coils 58 and 59 float, but for DC-operation, a fourth section 71 of the selector switch 28 closes a pair of lines 72, 73 connecting the center-tap of the secondary winding 55 to the coils 58, by which a relatively high voltage alternating current is made available for rectification by the rectifier means 60.

The power outlet terminals 47 and 48 are connected to the shorted circuit in such manner that current flows through the short therein. A representation of a shorted circuit is shown in FIGURE 4. A transmission line is here represented as a conductor 74 disposed within a steel conduit 75, there being electrical continuity from the one to the other at a point indicated at 76 representing a short. If alternating current of commercial wave form and frequency is caused to flow in a completed circuit represented by the conductor 74 and a second conductor 77, the magnetic field in the one conductor is cancelled by the magnetic field in the other conductor. So also, when such current flows in the conductor 74 and in the conduit 75 through the short 76, the field in one conductor of such parallel transmission line is for all practical purposes cancelled by the field produced by the current in the other conductor or conduit 75 of such transmission line. (The term "transmission line" are used herein is employed in a broad sense to include parallel wiring in general and its conduit, cables, and the like, and should not be construed in a restrictive sense. Thus, the configuration and number of conductors may vary considerably.)

However, in accordance with the principles of this invention, when the harmonically rich signal is applied from the terminals 47 and 48 to the conductors 74 and 75, a somewhat different result occurs of which I take advantage. The velocity of propagation of a signal along a line is a function of its frequency. Therefore, when many frequencies are present as in my signal, individual frequency components do not all move at the same velocity and do not all arrive at the short 76 at the same instant. Therefore, there is a slight difference in magnetic field that makes substantially complete cancellation thereof impossible. Stated otherwise, the nonsinusoidal wave form is produced by a large number of harmonically related sinusoidal currents which are harmonics of the fundamental. These harmonics vary as to amplitude, as to frequency, and as to wave length with respect to each other so that an external field is produced by the net differences in current between these harmonic components. By Fourier analysis, a wave form or shape may be broken down into a fundamental sinusoidal frequency and a number of its sinusoidal harmonics. However, when they are combined as here, a nonsinusoidal result is present. Where all such harmonics are integral harmonics of the fundamental, which is the situation here described, the output signal appears to be steady.

In the use of my method and means for detecting the location of a short, I prefer that at least one of the frequencies present in the non-sinusoidal wave form be one which is within the range of audible frequencies. This facilitates the use of earphones. More specifically, I prefer that the fundamental frequency be within such audible frequency range, and that it be above the highest ambient frequency present which might be expected from any other nearby source of magnetic field produced by alternating current. In many installations, it would thus suffice if the fundamental frequency were distinctly above 60 cycles per second. In equipment where 400 cycles per second is customary, such as in locomotives or as in aircraft, it is therefore preferable that the fundamental be above such frequency, for example 500 cycles per second. The values given herein are those which I have employed to obtain a harmonically rich signal of the wave form shown in FIGURE 2 having a fundamental frequency of about 500 cycles per second.

Thus, the method and means of this invention by which the location of a short may be detected includes the application of a composite electric current composed of sinusoidal alternating currents of frequencies in harmonic relation to each other, such composite current being applied to the shorted circuit in such manner that the composite current flows through the short itself. Doing so produces unbalanced currents which produce a net magnetic field which extends from the shorted circuit, even though the conductors thereof comprise a parallel transmission line, coaxial cable, or a conductor within a conduit. Thereafter, using appropriately sensitive means, the resulting magnetic field is sensed and relative measurements thereof are made to indicate the physical limits of such field, and hence the point where the field terminates. Such point is physically defined by the short and is indicated by an abrupt change by a large amount of the relative field strength. The steeper the slope and the sharper the pip, tip, or spike on the wave form the more harmonics are present and the more effective the instrument becomes for my purpose.

In FIGURE 3 there is indicated the circuit of the sensing portion of this invention, which portion includes a pickup 78, a 3-stage signal amplifier generally indicated at 79, and transducing means generally indicated at 80.

The pickup 78 includes a ferrite core, such as one which is ¼" in diameter and 1½" long, wound with 1000 turns of No. 40 magnet wire, such coil being enclosed in a shield, in this example such shield being about ⅝" in diameter. The coil is schematically illustrated at 81 and the shield at 82, the coil 81 being connected by a shielded conductor 83 to a potentiometer or voltage divider 84. The entire signal sensed by the pickup 78 appears across the potentiometer 84 and a portion thereof is transferred by its wiper 85 through a coupling capacitor 86 to a first transistorized amplifier stage 87, of a known type. This stage is coupled by a further coupling capacitor 88 to a second identical amplifier stage 89 which is coupled by a capacitor 90 to a third such amplifier stage 91. The amplified output signal is led by a capacitor 92 to a load resistor 93. The signal across such resistor may be listened to by earphones 94 or may be measured by a voltmeter 95. The voltmeter 95 is provided with a multiplier or range resistor 96 and a rectifier 97 so that a DC-movement may be employed, it being preferable to further include a capacitor 98 connected across the meter 95 and the range resistor 96 to render the meter 95 responsive to peak voltages which are stored by the capacitor 98.

Preferably, the coupling capacitor 86 is made relatively small to exclude such frequencies as are expected from ambient fields, but such capacitor being sufficiently large so as to conduct the signal frequencies without appreciable attenuation of signals produced by the test fields.

The sensing means is powered by a battery 99 which is connected through a switch 100 across each of the stages. A pair of resistors 101 and 102 are connected in series with each other and across the battery 99, their common point being the input point of the amplifier stage to which the coupling capacitor is connected for injecting the signal. This point is also connected to the base of a transistor 103 the collector of which is connected through a resistor 104 to the negative terminal of the battery 99, and the emitter 105 of which is connected through a resistor 106 to the positive terminal of the battery 99. A capacitor 107 is connected across the resistor 106.

The circuit shown in FIGURE 3 thus includes a pick-up which is connected to a battery-powered high-gain transistorized amplifier which drives an appropriate transducer for indicating the amplified signal. Although the capacitor 86 is sized to attenuate signals from ambient fields below the lowest frequency present in the composite current, its value may be increased, such as by switching, for adapting the circuit to be employed to detect the location of properly operating lower frequency circuits which are giving off a magnetic field. However, with the attenuation described included, it is possible to leave such other circuits energized and operating during the preferred use of this device. (If it is desired to allow commercial frequencies to pass through the capacitor 86, all that is necessary is that it be sized like the capacitors 88 and 90. However, in its preferred use, this circuit is particularly advantageous for detecting the location of a short in a shorted 2-conductor parallel transmission line as explained.)

Although the circuit shown in FIGURE 1 produces an output signal which is of substantially constant wave form, and which is applied to the terminals represented by the numerals 74 and 75 of the shorted circuit, the wave form sensed by the pickup 78 as it is moved along the shorted circuit is quite unpredictable, is complex, varies depending upon the nature of the shorted circuit, and varies as the pickup is moved along the unbalanced-current produced fields. However, when the shorted point represented by the numeral 76 is passed by, the field drops abruptly. This abrupt indication of field drop can be employed to pinpoint the location of the short as being within a zone approximately the size of the pickup itself. Thereafter, visual inspection or other examination by the user will usually readily identify further the nature of the short. Thus, in a system of wiring where a screw has penetrated a conduit or junction box and has engaged one of the conductors of the transmission line therein enclosed, this pickup will lead the user directly to such screw. In a locomotive, or in another device having a complex internal circuit, the point of future grounding or other short circuit may not become conductive until after considerable use so that prolonged vibration ultimately brings about the establishment of continuity between such a screw and an enclosed conductor.

The highest reading on the meter 95 for each of the AC-settings of the selector switch 28 indicates the most power transfer, and hence the best matching of the impedance of the signal source with the line to be tested.

The potentiometer 84 serves to keep the readings of the meter 95 on scale. With the potentiometer 84 set to a maximum, and with the selector switch 28 set to a minimum AC-value (maximum current), I have been able to detect the resulting magnetic field produced in a shorted parallel transmission line as shown in FIGURE 4 at a distance of one foot with a full scale reading. As the pickup was moved closer, the sensitivity potentiometer 84 was employed to lessen the effectiveness of the signal. With a piece of No. 12 gage steel disposed between the conduit and the probe or pickup, full scale readings were obtained three inches away. When the shorted transmission lines are not enclosed in a conduit or otherwise shielded as described, such as in a shorted lamp cord, full scale readings have been obtained three feet away from such transmission line.

In ordinary usage, the sensitivity potentiometer 84 is adjusted to place the reading of the meter 95 approximately on midscale so that the user can see if he is moving away from or toward the shorted circuit being tested.

Preferably the maximum voltages available at the outlet terminals 47, 48 are indicated adjacent to the selector switch 28 so that the user is warned against possibly using the same in conjunction with circuit components that might be damaged by application of such a potential.

When the selector switch 28 is in the DC-position, the slider 69 is preferably first moved to a minimum voltage position and then the button 70 is depressed. Thereafter the slider 69 is moved so as to gradually increase the DC-voltage and the current to any convenient level indicated on the meters 55 and 65 from which the DC-resistance can be calculated according to Ohm's law. DC-voltages up to 350 volts are thus available with the circuit described.

The following values have been utilized:

Capacitors

| Mfd. | |
|---|---|
| 14 | 1 |
| 37 | .6 |
| 43 | .002 |
| 45 | 2 |
| 52 | 2 |
| 54 | 2 |
| 62 | 2 |
| 86 | .2 |
| 88 | 5 |
| 90 | 5 |
| 92 | 5 |
| 98 | 10 |
| 107 | 50 |

Resistors

| Ohms | |
|---|---|
| 32 | 10 |
| 57a | 10,000 |
| 66 | 500,000 |
| 67 | 50 |
| 84 | 25,000 |
| 93 | 8,500 |
| 96 | 3,800 |
| 101 | 100,000 |
| 102 | 10,000 |
| 104 | 5,000 |
| 106 | 1,000 |

Transistors 11, 12—Tung Sol ET6
103—2N190 for stages 87 and 89
2N321 for stage 91

Batteries

17—Eveready 409 (6 v.)
99—Eveready 216 (9 v.)

Diodes

61—Sarkes Tarzian M500 or Pacific Semiconductor TP 400

Meter

65—1,000 ohms per volt

Although various minor modifications might be suggested by those versed in the art, it should be understood that I wish to embody within the scope of the patent warranted hereon all such embodiments as reasonably and properly come within the scope of my contribution to the art.

I claim as my invention:

1. A method for detecting the location of a short between a pair of conductors in a shorted circuit, said conductors being disposed in physically parallel relation to each other, comprising the steps of:
    (a) applying a composite electrical current, having a non-sinusoidal wave form composed of a plurality of harmonically related frequencies with at least one pip per cycle, to the conductors in such manner as to cause said composite current to flow through said short and said shorted circuit; and
    (b) indicating the location of said short by sensing the resulting magnetic field along said shorted circuit to the point where said field terminates.

2. A method as claimed in claim 1, which includes at least approximately matching the impedance of the source of composite electrical current to that of the shorted circuit by altering the impedance of the source.

3. A method for determining the location of a short between the conductors in a shorted 2-conductor parallel transmission line, comprising the steps of:
    (a) applying a composite electrical current, composed of sinusoidal alternating currents of frequencies in harmonic relation to each other, said frequencies consisting of a fundamental frequency and a plurality of its integral harmonics coacting to produce a composite waveform with at least one pip per cycle, to the conductors in such manner as to cause said composite current to flow in said transmission line through the short; and
    (b) indicating the location of said short by sensing the point along the transmission line where the magnitude of the resulting magnetic field abruptly changes by a large amount.

4. A detector for detecting the location of a short between the conductors in a shorted 2-conductor parallel transmission line, comprising in combination:
    (a) a pluse generator operative to provide a composite electric current composed of sinusoidal alternating currents of frequencies in harmonic relation to each other, said currents being such as to produce a composite waveform with at least one pip per cycle, said generator being constructed to be connected to said conductors for passing said current through the short; and
    (b) means movable along the transmission line and responsive to the magnetic field produced by unbalance of said currents along the line and operative to indicate the point where said field terminates.

5. Apparatus as claimed in claim 4, in which said frequencies consist of a fundamental frequency and a plurality of its integral harmonics.

6. Apparatus as claimed in claim 4, in which said means comprises a ferrite core, and a coil wound thereon in which coil said signal is produced.

7. Apparatus as claimed in claim 4, wherein said means includes a pickup capacitatively connected to an amplifier, characterized in that the capacitor between said amplifier and said pickup is sized to attenuate any signals induced by any ambient fields having a frequency below the lowest frequency in said composite current, and said means being operative to indicate visually the magnitude of the amplified signal.

8. A detector for detecting the location of a short between the conductors in a shorted 2-conductor parallel transmission line, comprising in combination:
    (a) an astable multivibrator having two quasi-stable states normally operative to switch periodically from one of said states to the other, and having a third state of stability intermediate said quasi-stable states;
    (b) an output transformer having a center-tapped primary winding forming a part of said multivibrator, and at least one secondary winding operative to provide a composite electric current composed of sinusoidal alternating currents of frequencies in harmonic relation to each other coacting to produce a composite waveform with at least one pip per cycle, said transformer being constructed to be connected to said conductors for passing said current through the short;
    (c) at least one capacitative connection from one end of said primary winding to its center-tap for upsetting said third state of stability; and
    (d) means movable along the transmission line and responsive to the resulting magnetic field and operative to indicate the point where said field terminates.

9. A detector for detecting the location of a short between the conductors in a shorted 2-conductor parallel transmission line, comprising in combination:
    (a) an astable multivibrator having two quasi-stable states normally operative to switch periodically from one of said states to the other, and having a third state of stability intermediate said quasi-stable states;
    (b) an output transformer having a center-tapped primary winding forming a part of said multivibrator and at least one secondary winding operative to provide a composite electric current composed of sinusoidal alternating currents of frequencies in harmonic relation to each other, said transformer being constructed to be connected to said conductors for passing said current through the short;
    (c) rectifier means including capacitors connected to said secondary winding for providing high voltage direct current to said conductors;
    (d) a capacitative connection from one end of said primary winding to the center-tap of said primary winding for upsetting said third state of stability, said capacitative connection including one of said capacitors of said rectifier means; and
    (e) means movable along the transmission line and responsive to the resulting magnetic field and operative to indicate the point where said field terminates.

References Cited

UNITED STATES PATENTS

| | | | |
|---|---|---|---|
| 2,199,846 | 5/1940 | Borden | 324—52 |
| 2,769,868 | 11/1956 | Brownlow | 324—52 X |
| 2,883,539 | 4/1959 | Bruck et al. | 331—113.1 X |
| 2,951,994 | 9/1960 | Noordanus et al. | 331—113.1 |
| 2,993,167 | 7/1961 | Smith | 324—52 |
| 3,066,256 | 11/1962 | Rasor | 324—67 X |
| 3,070,759 | 12/1962 | Brouwer | 331—113.1 |
| 3,079,525 | 2/1963 | Tap | 331—113.1 X |
| 3,141,128 | 7/1964 | Behr | 324—51 |
| 3,159,786 | 12/1964 | Bayne | 324—60 |
| 3,181,085 | 4/1965 | Lloyd | 331—113.1 |

OTHER REFERENCES

"Locating Underground Cable Faults", Electrical World Dec. 26, 1925, vol. 86, No. 26, pp. 1297–1300.

"Probe Identified Cable Wiring" by Rushton, Electronics vol. 34, No. 9, Mar. 3, 1961, p. 51.

RUDOLPH V. ROLINEC, *Primary Examiner.*

G. R. STRECKER, *Assistant Examiner.*

U.S. Cl. X.R.

321—2; 331—113